United States Patent [19]
Collins

[11] Patent Number: 5,694,988
[45] Date of Patent: Dec. 9, 1997

[54] FUEL TRANSFER DEVICE

[75] Inventor: Joseph B. Collins, Pitman, N.J.

[73] Assignee: Eco Guard, St. Davids, Pa.

[21] Appl. No.: 633,395

[22] Filed: Apr. 16, 1996

[51] Int. Cl.[6] .................................................. B65B 31/00
[52] U.S. Cl. ............................ 141/59; 141/290; 141/301; 141/382
[58] Field of Search ................................. 141/18, 20, 59, 141/95, 98, 290, 301, 382, 387, 388

[56] References Cited

U.S. PATENT DOCUMENTS

| | | | |
|---|---|---|---|
| 2,599,699 | 6/1952 | Dilworth et al. | 158/36.3 |
| 3,170,495 | 2/1965 | Wagner | 141/388 |
| 3,674,043 | 7/1972 | Norton | 137/12 |
| 3,774,654 | 11/1973 | Hjermstad | 141/382 |
| 4,167,958 | 9/1979 | Voelz | 141/95 |
| 5,207,203 | 5/1993 | Wagner et al. | 123/514 |
| 5,255,723 | 10/1993 | Carmack et al. | 141/59 |
| 5,385,178 | 1/1995 | Bedi | 141/59 |
| 5,423,303 | 6/1995 | Bennett | 123/527 |

FOREIGN PATENT DOCUMENTS

| | | | |
|---|---|---|---|
| 231 389 A1 | 12/1995 | German Dem. Rep. | F02M 37/14 |
| 2 123 892 | 2/1984 | United Kingdom | F02M 37/20 |

*Primary Examiner*—Henry J. Recla
*Assistant Examiner*—Timothy L. Maust
*Attorney, Agent, or Firm*—Seidel Gonda Lavorgna & Monaco, PC

[57] ABSTRACT

A fuel transfer device for transferring fuel from the fuel supply line of an internal combustion engine to, for example, a fuel receiving vessel, with reduced loss of vapor to the environment. A fuel supply conduit includes a fuel flow control valve and a vapor recovery hood, and is connected to the fuel supply line of an internal combustion engine. Vapor is returned to the air intake manifold of the engine by way of a vapor return conduit.

37 Claims, 2 Drawing Sheets

FUEL TRANSFER DEVICE

FIELD OF THE INVENTION

The present invention relates to a device for use in the safe and environmentally sound transfer of fuel directly from the fuel supply line of an internal combustion engine to a fuel receiving vessel. The present invention provides a safer, more convenient and environmentally responsible means of accomplishing these tasks than currently prevailing practices.

BACKGROUND OF THE INVENTION

The proliferation of gasoline-powered appliances, including, but not limited to snow blowers, riding tractors, mowers, pumps, generators, and lawn and garden equipment, has caused a need for a safe and environmentally sound way to transfer fuel. Further, it is often necessary to refill the fuel tank of a vehicle once the vehicle has run out of fuel distant from a gasoline filling station. Presently, the transfer of fuel is accomplished by either bringing the appliance or vehicle to a gasoline filling station, or by maintaining filled, discrete portable fuel containers for later use.

The drawbacks of these two methods of transferring fuel are numerous. In the case of gasoline filling stations, it is often burdensome and time consuming to bring a gasoline-powered appliance to those locations, which are sometimes remote from where the fuel is needed. Where a vehicle has run out of fuel, it is usually impractical to transport the vehicle to a gasoline filling station. Therefore, portable fuel tanks or other containers are often used to transfer fuel from gasoline filling stations to gasoline-powered appliances and vehicles.

The storage of fuel in these containers is inherently dangerous. These containers are notorious fire hazards. Fuel which is not immediately used may remain in these containers in the garage or another area of a person's home for a substantial amount of time, prolonging the danger of fire or explosion.

The transfer of fuel in this manner is also an inherent environmental hazard, in that spillage inevitably occurs when transferring fuel to gasoline powered appliances or vehicles. It may also be true that these fuel containers have a small capacity for fuel storage, and thus must be refilled often.

Regulation and/or control of the handling of fuels, especially those fuels used in gasoline-powered appliances such as those described above, is virtually nonexistent. Gasoline filling stations monitored by federal and state agencies are equipped to address problems related to accidental spillage of fuel and the release of harmful vapors into the atmosphere. The type of containers used in the transportation and storage of these materials is also regulated and policed by D.O.T., OSHA and the EPA and, in addition, the aforementioned gasoline filling stations.

Motor vehicle manufacturers also equip their products with systems to contain and treat unspent fuel and vapor, as well as those pollutants generated by the combustion process. These vehicles are also engineered to store and carry their on-board fuel supply well protected against accidental spillage or ignition. The performance of these systems is also regulated and monitored in the interest of public safety and concern for the environment.

Thus, fuel is stored in a safe and environmentally sound way in the on-board storage tank of a host vehicle. A device which utilizes the on-board storage tank of a vehicle as its fuel supply would avoid the problems associated with discrete fuel containers.

There is, accordingly, a need for a safe, efficient and environmentally sound apparatus for transferring fuel without the use of secondary containers.

SUMMARY OF THE INVENTION

The present invention is directed to a device that satisfies the need for the safe, convenient and environmentally sound transfer of fuel without the use of storage containers. The present invention provides a truly innovative and effective solution to these problems at a cost to the user that is insignificant compared to the safety, convenience and environmental benefits it produces. A fuel transfer device having features of the present invention comprises a fuel supply conduit having an inlet end and an outlet end. The inlet end of the fuel supply conduit is in fluid communication with the fuel supply line of an internal combustion engine. The outlet end of the fuel supply conduit is positionable in the opening of a fuel receiving vessel. A valve for regulating the flow of fuel through the fuel supply conduit is located adjacent the outlet end of the fuel supply conduit. A means for recovering vapor is disposed about the outlet end of the fuel supply conduit downstream from the valve.

The present invention also has a vapor return conduit, which has an inlet end and an outlet end. The inlet end is located adjacent the outlet end of the fuel supply conduit, is positionable adjacent the opening of the fuel receiving vessel, and is in fluid communication with the interior of the means for recovering vapor. The outlet end of the return conduit is in fluid communication with the air intake manifold of the internal combustion engine.

Unlike the fuel containers presently known in the art, the present invention provides the user a precise means of directing the stream and controlling the flow or volume of fuel being dispensed, affording zero spillage. It eliminates the need for fuel cans or containers and the risk associated with storing and handling them.

Further, the present invention eliminates the need for the dangerous and unhealthy practice of siphoning fuel through a hose.

The present invention eliminates trips to a filling station and the associated odors and inconvenience. It connects and disconnects from its host quickly and is ready for use in seconds. The invention is contained in a small, unobtrusive package and easily carried or stored.

The present invention's potential for providing zero-spillage dispensing limits the possibilities of ground contamination and fuel wastage. The invention also comprises a means for the recovery and processing of vapors expelled during dispensing. The vapor recovery functions of the invention can be applied to heating fuel delivery vehicles to eliminate the significant amount of contamination produced by their activities.

DETAILED DESCRIPTION OF THE INVENTION

Figure 1:
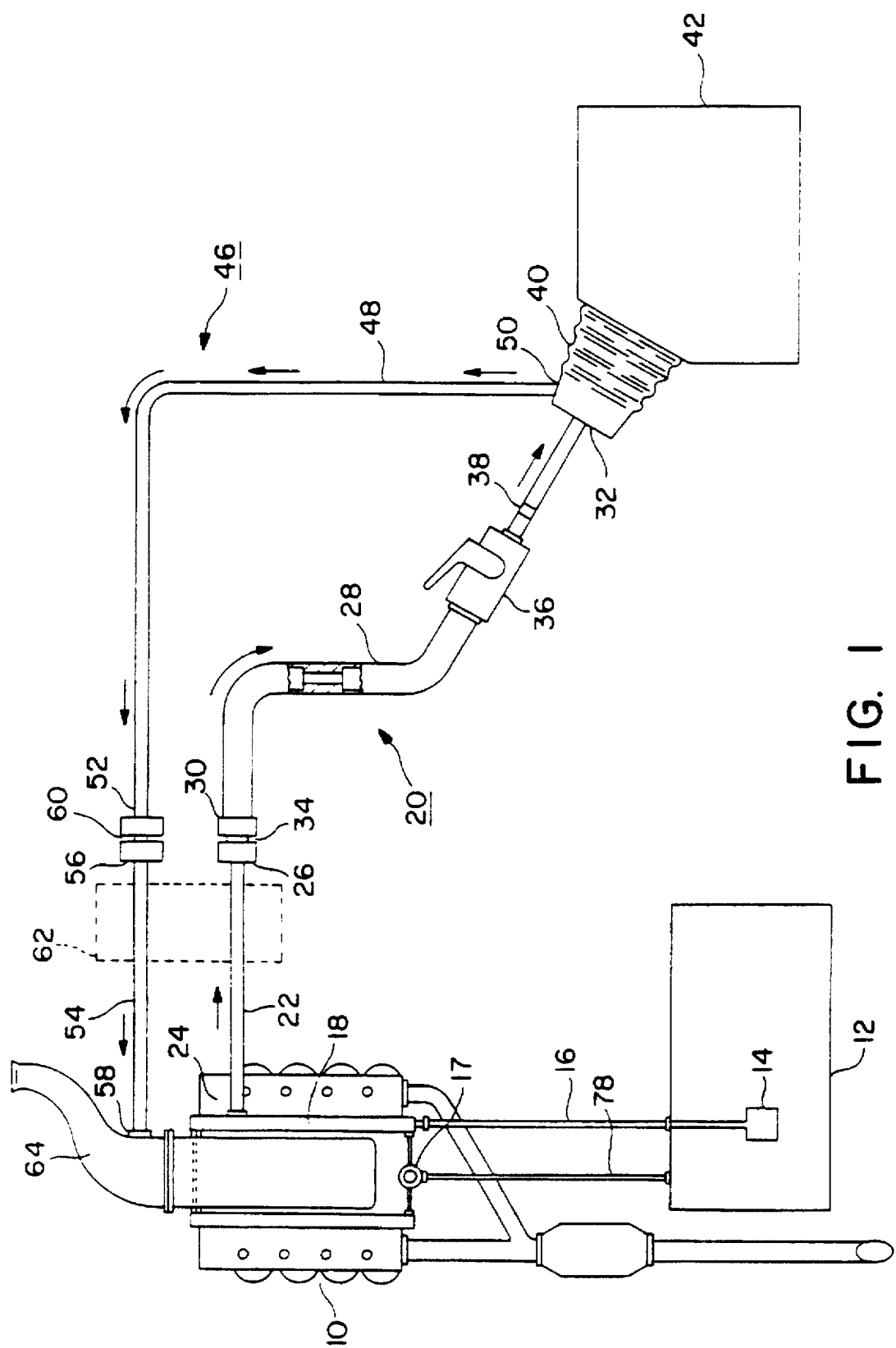
FIG. 1 shows a schematic view of the present invention in operation attached to a fuel injected internal combustion engine.

For the purpose of illustrating the invention, there is shown in the drawings a form which is presently preferred;

it being understood, however, that this invention is not limited to the precise arrangements and instrumentalities shown.

Referring to the drawings, wherein like numerals refer to like elements, the present invention generally comprises a fuel transfer device for transferring fuel directly from the fuel supply line of an internal combustion engine. The internal combustion engine may be a carburetted engine or one that employs a fuel injection system. A fuel supply conduit 20, having an inlet end 24 and an outlet end 32, is attached to the fuel supply line 16 of an internal combustion engine 10 with the fuel supply line 16 and the inlet end 24 of the fuel supply conduit 20 in fluid communication. The outlet end 32 of the fuel supply conduit 20 is unattached and positionable in the opening 80 of a fuel receiving vessel 42. A fuel flow control valve 36 is located adjacent the outlet end 32 of the fuel supply conduit 20 for controlling the flow of fuel through the conduit.

A vapor recovery hood 40 is disposed about the outlet end 32 of the fuel supply conduit 20 downstream from the fuel flow control valve 36. The vapor recovery hood 40 is sized to cover the opening 80 of the fuel receiving vessel 42. Vapor escaping the fuel receiving vessel 42 is captured in the vapor recovery hood 40.

A vapor return conduit 46, having an inlet end 50 and an outlet end 58, is in fluid communication with the vapor recovery hood 40. Vapor entering the hood 40 flows into the vapor return conduit 46 through the inlet end 50. The inlet end 50 of the vapor return conduit 46 is located adjacent the outlet end 32 of the fuel supply conduit 20. The outlet end 58 of the vapor return conduit 46 is in fluid communication with the air intake manifold 64 of the engine 10.

Under the normal working conditions of a fuel injected internal combustion engine, supply fuel is stored in the on-board fuel storage tank 12 of the host vehicle. A fuel pump 14 supplies fuel from the storage tank 12 through the fuel supply line 16 of the engine 10. Fuel then passes from the fuel supply line 16 to the primary fuel line 18. The primary fuel line 18 supplies fuel directly to the engine 10. The primary fuel line 18 will supply fuel directly to the fuel injectors (not shown) of the engine 10. Fuel which is not utilized by the fuel injectors flows from the primary fuel line 18, through the fuel return line 78, and back to the storage tank 12. A fuel pressure regulator 17 maintains constant fuel pressure in the fuel supply line by allowing excess fuel to pass through the fuel return line 78. Fuel in excess of that used by the engine 10 passes through the regulator 17 and returns to the fuel tank 12 via a shunt line which acts to connect the fuel supply line 16 and the fuel return line 78.

As shown in FIG. 1, in the preferred embodiment a fuel supply conduit 20 comprises a first portion 22 and a second portion 28. The fuel supply conduit 20 may be constructed of any material compatible with the operating pressure of the system and resistant to possible deterioration caused by chemical reaction with the fuel. Each portion 22, 28 of the fuel supply conduit 20 has both an inlet end and an outlet end, the inlet end receiving fuel from the host vehicle's engine, and the outlet end dispensing such fuel.

In the embodiment illustrated, the first portion 22 of the fuel supply conduit 20 has the inlet end 24 in fluid communication with the primary fuel line 18 of a fuel injected internal combustion engine 10. This connection can be accomplished by having the inlet end 24 of the first portion 22 adapted to threadedly engage the primary fuel line 18, or by the installation of a T-fitting at any point in the primary fuel line 18. It is appreciated that the source of fuel in fluid communication with the fuel supply conduit may be any pressurized source of fuel from an internal combustion engine, including, but not limited to, the fuel supply line 16. It is also understood that the primary fuel line 18 may be the fuel rail (not shown) or other fuel line of a fuel injected internal combustion engine.

Figure 3:
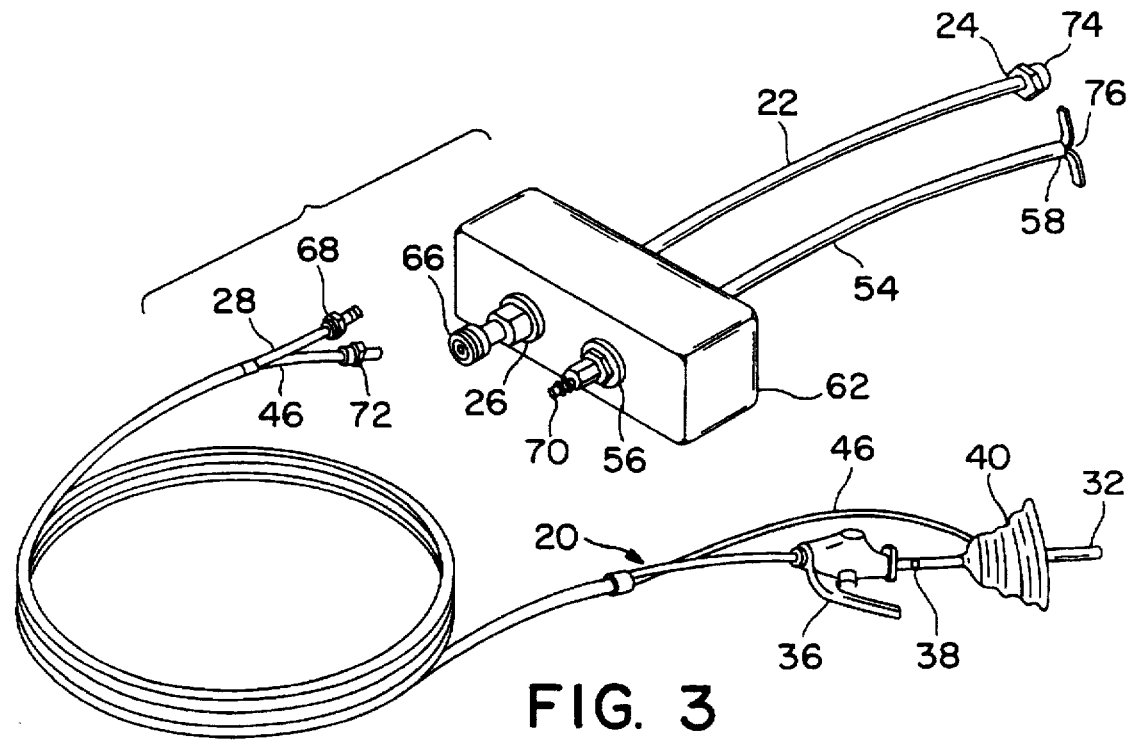
FIG. 3 shows an isometric view of the preferred embodiment of the present invention.

The outlet end 26 of the first portion 22 is detachably coupled with the inlet end 30 of the second portion 28 by a fuel supply coupling 34. When mated, the two portions 22, 28 are in fluid communication. The fuel supply coupling 34 illustrated in FIG. 1 and FIG. 3 is a quick disconnect dry break coupling, familiar to those skilled in the art. These couplings provide a quick and effective means for joining conduits in fluid communication, while preventing the loss of fluids therein to the environment during engagement or disengagement.

In the preferred embodiment, as shown in FIG. 3, the part of the fuel supply coupling 34 containing the female member 66 is attached to the outlet end 26 of the first portion 22 of the fuel supply conduit 20, while the part containing the male member 68 is attached to the inlet end 30 of the second portion 28. When mated, the fuel supply coupling 34 will allow fuel to flow freely from the first portion 22 to the second portion 28 of the fuel supply conduit 20. When separated, the separate members 66, 68 of the fuel supply coupling 34 will seal, allowing no loss of fuel to the environment.

Figure 2:
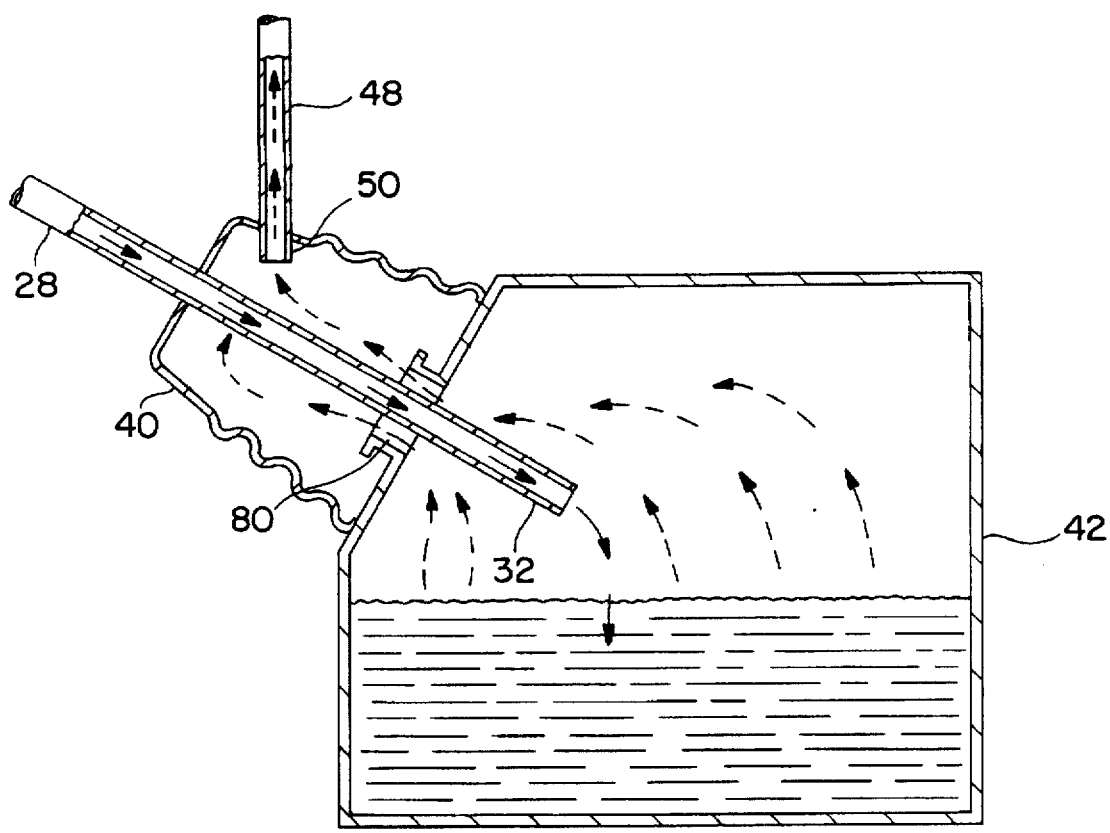
FIG. 2 shows a sectional view of the fuel receiving vessel.

As shown in FIG. 2, the outlet end 32 of the second portion 28 of the fuel supply conduit is positionable in the opening 80 of a fuel receiving vessel 42, such that fuel can be dispensed into the receiving vessel 42. In the present embodiment, a fuel flow control valve 36 is located adjacent the outlet end 32 of the second portion 28 of the fuel supply conduit 20.

The fuel flow control valve 36 functions to regulate and interrupt the flow of fuel through the fuel supply conduit 20. In the embodiment illustrated, the fuel flow control valve 36 is a valve which is biased into the closed position, such as by a spring. A lever or trigger mechanism is connected to the valve. When the lever is actuated, the valve 36 will open, and fuel will flow freely through the fuel supply conduit 20. In this way, the flow of fuel is controlled by the user. The fuel flow control valve 36 may be of the kind having a flow control poppet valve, an elongated valve stem to engage the lever, and a flow control valve-compression spring to bias the lever and the poppet valve in a normally closed position. It is also anticipated that the fuel flow control valve 36 can include a conventional trigger mechanism such as that employed on conventional gasoline nozzle dispensers as known in the art.

Located within the fuel supply conduit 20 downstream from the fuel flow control valve 36, is a flow regulator 38 for controlling the volume of fuel flowing through the fuel supply conduit 20. This flow regulator 38 functions to prevent the stalling of the host vehicle's engine when dispensing fuel with the present invention. The flow regulator 38 illustrated is a simple orifice having a fixed bore dimension. It is recognized that the flow regulator 38 may be controlled by mechanical, electro-mechanical or positive/negative pressure devices without departing from the invention.

The flow regulator 38 provides backflow pressure directed toward the fuel supply line 16. If the fuel supply conduit 20 is damaged upstream from the flow regulator 38, pressure will be lost in the fuel supply conduit 20. The host vehicle's engine will shut down, and fuel will stop being supplied to the conduit 20, due to the host vehicle's on-board sensors automatically shutting the fuel pump in response to such pressure loss.

The outlet end 32 of the second portion 28 of the fuel supply conduit 20 has a vapor recovery hood 40 disposed about it, downstream from the fuel flow control valve 36. The vapor recovery hood 40 is fixed adjacent the outlet end 32 of the second portion 28 of the fuel supply conduit 20. The outlet end 32 of the second portion 28 of the fuel supply conduit 20 passes through the base of the vapor recovery hood 40. As illustrated in more detail in FIG. 2, the vapor recovery hood 40 of the preferred embodiment is an elastomeric bellows. The bellows flexes or compresses to resiliently maintain a substantially vapor-tight seal with the surface of the fuel receiving vessel 36 surrounding the opening 80. The vapor recovery hood 40 may be constructed of any material compatible with the operating pressures of the system and resistant to possible deterioration caused by a chemical reaction with the vapors.

In the preferred embodiment, the vapor return conduit 46 comprises a first portion 48 and a second portion 54. The inlet end 50 of the first portion 48 is in fluid communication with the interior of the vapor recovery hood 40, and is located adjacent to the outlet end 32 of the second portion 28 of the fuel supply conduit 20. The inlet end 50 of the first portion 48 of the vapor return conduit 46 is in fluid communication with the vapor recovery hood 40. Vapor trapped in the vapor recovery hood 40 will flow outward from the interior of the hood 40 into the vapor return conduit 46. The flow path of the recovered vapor is indicated by dashed lines in FIG. 2.

The outlet end 52 of the first portion 48 of the vapor return conduit is detachably coupled to the inlet end 56 of the second portion 54 with a vapor return coupling 60, such that a substantially air-tight seal is formed. The vapor return coupling 60 is similar in design to the fuel supply coupling 34 described above. As illustrated in FIG. 3, this coupling has a part containing a female member 72 attached to the outlet end 52 of the first portion 48 of the vapor return conduit 46, and a part containing a male member 70 attached to the inlet end 56 of the second portion 54 of the vapor return conduit 46. The coupling 60 may be a quick disconnect dry break coupling known to those in the art, which may, but need not be, of the double sealing, single sealing or non-sealing type. The diameter of the vapor return coupling 60 may be of a different diameter than that of the fuel supply coupling 34, further decreasing any possibility that the couplings could be erroneously mated.

The outlet end 58 of the second portion 54 of the vapor return conduit is in fluid communication with the air intake manifold 64 of the internal combustion engine 10. Attachment of the outlet end 58 of the second portion 54 of the vapor return conduit 46 to the air intake manifold 64 is accomplished in the preferred embodiment using a T-coupling 76. This T-coupling attaches the outlet end 58 of the second portion 54 of the vapor return conduit 46 to the manifold vacuum line of the engine 10. The air intake manifold is under vacuum created by air being drawn into the combustion chambers of the engine 10. Any vapor trapped in the interior of the vapor recovery hood 40 will be drawn through the vapor return conduit 46 back into the air intake manifold 64 of the engine 10.

In the preferred embodiment, a connector block 62 is disposed about the first portion 22 of the fuel supply conduit 20 and the second portion 54 of the vapor return conduit such that the portions 22, 54 are held substantially parallel to one another. The connector block 62 functions to provide support for permanently or semi-permanently securing the first portion 22 of the fuel supply conduit 20 and the second portion 54 of the vapor return conduit 46 to the engine 10. The connector block 62 comprises a material which is substantially rigid and molded to securely hold the fuel supply conduit and the vapor return conduit 46 in parallel orientation to one another, as shown in FIG. 3. The connector block 62 may be constructed of any suitable material compatible with exposure to the operating environment of the internal combustion engine.

As shown in FIG. 3, the connector block 62 may be disposed adjacent the outlet end 26 of the first portion 22 of the fuel supply conduit 20, and adjacent the inlet end 56 of the second portion 54 of the vapor return conduit 46. The female member 66 of the fuel supply coupling 34 and the male member 70 of the vapor return coupling 60 rest flush the connector block 62. Thus, the connector block provides a face for releasably connecting the second portion 28 of the fuel supply conduit 20 and the first portion 48 of the vapor return conduit 46 when the present invention is in use.

In one embodiment, the connector block 62 is located on the outside of the host vehicle's grill, with the first portion 22 of the fuel supply conduit extending through the grill and in fluid communication with the primary fuel line 18, and the second portion 54 of the vapor return conduit 46 extending through the grill and in fluid communication with the air intake manifold 64. It is also understood that the connector block 62 may be attached to the frame or engine of the host vehicle in any manner where the connector block 62 will not interfere with the normal operation of the engine 10.

It is anticipated that the fuel supply conduit 20 and the vapor return conduit 46 may be arranged in any manner suitable for safety and convenience. For example, the vapor return conduit 46 may annularly surround the fuel supply conduit 20 to provide a coaxial conduit assembly. In another embodiment, shown in FIG. 3, the second portion 28 of the fuel supply conduit 20 and the first portion 48 of the vapor return conduit 46 are wrapped in a reinforced braided nylon sleeve. This provides a convenient arrangement of the conduits for transportation and storage.

When the engine 10 is at idle, the fuel pressure regulator 17 maintains a constant pressure in the fuel supply line 16, and in turn, the primary fuel line 18. When the first portion 22 of the fuel supply conduit 20 is threadedly engaged to and in fluid communication with the primary fuel line 18, this pressure will cause fuel to flow into the first portion 22 of the fuel supply conduit. When the second portion 28 of the fuel supply conduit 20 is not attached to the first portion 22, the outlet end 26 of the first portion 22 will be sealed. In this way, pressure will be maintained in the primary fuel line 18 and in the fuel supply line 16. Thus, having the fuel supply conduit attached to the primary fuel line 18 will not interfere with normal operation of the host vehicle's engine 10.

When the second portion 28 of the fuel supply conduit 20 is connected to the first portion 22, fuel flows freely therethrough. When the lever located on the fuel flow control valve 36 is not actuated, the fuel flow control valve 36 will be biased in the closed position, and fuel will not be able to flow through the control valve 36. Once the lever on the fuel flow control valve 36 is actuated by the user, it creates a drop in pressure causing the fuel pressure regulator 17 to close. This stops the fuel pressure regulator 17 from allowing fuel to flow back to the host vehicle's on-board fuel storage tank 12 via the fuel return line 78, and redirects fuel through the supply conduit of the invention. Fuel then flows through the control valve 36 and can be dispensed from the outlet end 32 of the second portion 28 of the fuel supply conduit 20.

During use of the present invention, the fuel flow regulator 38 provides backflow pressure to the fuel supply line 16. As long as this pressure is maintained, fuel will continue to be supplied to the fuel supply conduit 20. In the event that the fuel supply conduit 20 is damaged upstream from the flow regulator 38 in such a way as to puncture or break the conduit 20, pressure will be lost within the system. The loss of pressure will be sensed by the host vehicle's fuel supply sensors, and the host vehicle's engine will shut down, thus preventing the free flow of fuel into the surrounding environment through the break. Thus, the flow regulator 38 functions as a built-in safety device.

It is anticipated that the outlet end 32 of the fuel supply conduit 20 will be positioned in the opening 80 of a fuel receiving vessel 42 of some kind, as shown in more detail in FIG. 2. The flow of fuel is indicated by solid lines, while the flow of vapor is indicated by dashed lines.

The fuel receiving vessel 42 may be the kind having an upstanding lip at the opening 80 of the vessel. In that case, the vapor recovery hood 40 which is disposed about the second portion 28 of the fuel supply conduit 20, will surround the lip, such that any vapor will flow from the receiving vessel 42 into the hood 40. The outlet end 32 of the second portion of the fuel supply conduit may be positioned such that the outlet is extended into the opening 80 of the fuel receiving vessel 42. As fuel is being dispensed, the vapor recovery hood 40 will remain substantially flush with the surface of the fuel receiving vessel 42 surrounding the opening 80.

Where the fuel receiving vessel 42 does not have an upstanding lip at its opening, it is anticipated that the outlet end of the second portion of the fuel supply conduit will extend into the opening 80 of the fuel receiving vessel 42, while the vapor recovery hood 40 is substantially flush with the surface of the of the appliance or vehicle having the opening 80.

Fuel rising in the receiving vessel 42 forces air and vapor out and into the interior of the vapor recovery hood 40. Vapor captured in the vapor recovery hood 40 will be drawn up into the first portion of the vapor return conduit 46. When the first portion 48 and second portion 54 of the vapor return conduit 46 are mated by the vapor return coupling 60, vapor will flow freely through the vapor return conduit, and into the air intake manifold 64 of the host vehicle's engine 10. In this way vapor emissions are routed back to the host vehicle's engine, and are burned in the engine 10. Here they become part of the combustion process in the engine 10 and the combustion products are then processed by the host vehicle's pollution control systems before release into the atmosphere.

The present invention may be embodied in other specific forms without departing from the spirit or essential attributes thereof and, accordingly, reference should be made to the appended claims, rather than to the foregoing specification, as indicating the scope of the invention.

What is claimed is:

1. A fuel transfer device, comprising:
   (a) a fuel supply conduit having an inlet end and an outlet end, the inlet end adapted to be in fluid communication with the fuel supply line of an internal combustion engine, with the outlet end positionable in the opening of a fuel receiving vessel;
   (b) a fuel flow control valve located adjacent the outlet end of the fuel supply conduit for controlling the flow of fuel therethrough;
   (c) a vapor recovery means for recovering vapor adjacent the outlet end of the fuel supply conduit;
   (d) a vapor return conduit having an inlet end and an outlet end, the inlet end being in fluid communication with the vapor recovery means adjacent the outlet of the fuel supply conduit, with the outlet end adapted to be in fluid communication with the air intake manifold of an internal combustion engine.

2. The fuel transfer device according to claim 1, wherein the inlet end of the fuel supply conduit is in fluid communication with the primary fuel line of a fuel injected internal combustion engine.

3. The fuel transfer device according to claim 1, wherein the means for recovering vapor comprises a vapor recovery hood disposed about the outlet end of the fuel supply conduit, the hood having an opening through which the outlet end of the fuel supply conduit passes, the interior of said hood being in fluid communication with the inlet end of the vapor return conduit.

4. The fuel transfer device according to claim 3, wherein the vapor recovery hood comprises an elastomeric bellows.

5. The fuel transfer device according to claim 1, wherein the fuel supply conduit contains a flow regulator for controlling the volume of fuel flowing through the fuel supply conduit.

6. The fuel transfer device according to claim 5, wherein the fuel flow regulator comprises an orifice having a fixed bore dimension.

7. The fuel transfer device according to claim 1, wherein a connector block is disposed about the fuel supply conduit and the vapor return conduit so as to secure the conduits in parallel orientation, said connector block comprising a substantially rigid material.

8. The fuel transfer device according to claim 1, wherein the fuel flow control valve comprises:
   (a) a lever;
   (b) a poppet valve having an elongated valve stem in operative engagement with the lever; and
   (c) a spring to bias the lever and the poppet valve to a normally closed position.

9. The fuel transfer device according to claim 2, wherein the primary fuel line is the fuel rail of a fuel injected internal combustion engine.

10. The fuel transfer device according to claim 2, wherein the means for recovering vapor comprises a vapor recovery hood disposed about the outlet end of the fuel supply conduit, the hood having an opening through which the outlet end of the fuel supply conduit passes, the interior of said hood being in fluid communication with the inlet end of the vapor return conduit.

11. The fuel transfer device according to claim 10, wherein the vapor recovery hood comprises an elastomeric bellows.

12. The fuel transfer device according to claim 10, wherein the fuel supply conduit contains a flow regulator for controlling the volume of fuel flowing through the fuel supply conduit.

13. The fuel transfer device according to claim 12, wherein the fuel flow regulator comprises an orifice having a fixed bore dimension.

14. The fuel transfer device according to claim 12, wherein a connector block is disposed about the fuel supply conduit and the vapor return conduit so as to secure the conduits in parallel orientation, said connector block comprising a substantially rigid material.

15. The fuel transfer device according to claim 14, wherein the fuel flow control valve comprises:

(a) a lever;

(b) a poppet valve having an elongated valve stem in operative engagement with the lever; and (c) a spring to bias the lever and the poppet valve to a normally closed position.

16. A fuel transfer device comprising:

(a) a fuel supply conduit having an inlet end and an outlet end, the inlet end adapted to be in fluid communication with the primary fuel line of a fuel injected internal combustion engine, with the outlet end positionable in the opening of a fuel receiving vessel;

(b) a fuel flow control valve located adjacent to the outlet end of the fuel supply conduit for controlling the flow of fuel therethrough;

(c) a vapor recovery means for recovering vapor adjacent to the outlet end of the fuel supply conduit, said vapor recovery means comprising:

(i) a vapor recovery hood disposed about the outlet end of the fuel supply conduit, the hood having an opening through which the outlet end of the fuel supply conduit passes, the interior of said hood being in fluid communication with the inlet end of the vapor return conduit;

(d) a flow regulator located within the fuel supply conduit for controlling the volume of fuel flowing through the fuel supply conduit; and (e) a vapor return conduit having an inlet end and an outlet end, the inlet end being in fluid communication with the vapor recovery hood adjacent to the outlet of the fuel supply conduit, with the outlet end adapted to be in fluid communication with the air intake manifold of an internal combustion engine.

17. The fuel transfer device according to claim 16, wherein the primary fuel line is the fuel rail of a fuel injected internal combustion engine.

18. The fuel transfer device according to claim 16, wherein the fuel flow control valve comprises:

(a) a lever;

(b) a poppet valve having an elongated valve stem in operative engagement with the lever; and (c) a spring to bias the lever and the poppet valve to a normally closed position.

19. A fuel transfer device comprising:

(a) a fuel supply conduit, comprising:

(i) a first portion and a second portion, the first portion having an inlet end and an outlet end, the inlet end adapted to be in fluid communication with the fuel supply line of an internal combustion engine, and the outlet end being detachably coupled to the inlet end of a second portion;

(ii) said second portion having an inlet end and an outlet end, the inlet end detachably coupled to the outlet end of the first portion, with the outlet end of the second portion positionable in the inlet of a fuel receiving vessel;

(iii) a fuel supply coupling detachably coupling the first portion of the fuel supply conduit to the second portion of the fuel supply conduit;

(b) a fuel flow control valve located adjacent the outlet end of the second portion of the fuel supply conduit for controlling the flow of fuel therethrough;

(c) a vapor recovery means for recovering vapor disposed about the outlet end of the second portion of the fuel supply conduit; and (d) a vapor return conduit, comprising:

(i) a first portion and second portion, the first portion having an inlet end and an outlet end, the inlet end being in fluid communication with the vapor recovery means, the outlet end of the first portion of the vapor return conduit being detachably coupled to a second portion;

(ii) said second portion having an inlet end and an outlet end, the inlet end being detachably coupled with the outlet end of the first portion, and the outlet end of the second portion adapted to be in fluid communication with the air intake manifold of an internal combustion engine;

(iii) a vapor return coupling detachably coupling the first portion of the vapor return conduit to the second portion of the vapor return conduit.

20. The fuel transfer device according to claim 19, wherein the inlet end of the first portion of the fuel supply conduit is in fluid communication with the primary fuel line of a fuel injected internal combustion engine.

21. The fuel transfer device according to claim 19, wherein the means for recovering vapor comprises a vapor recovery hood disposed about the outlet end of the fuel supply conduit, the hood having an opening through which the outlet end of the fuel supply conduit passes, the interior of said hood being in fluid communication with the inlet end of the vapor return conduit.

22. The fuel transfer device according to claim 21, wherein the vapor recovery hood comprises an elastomeric bellows.

23. The fuel transfer device according to claim 19, wherein the fuel supply conduit contains a flow regulator for controlling the volume of fuel flowing through the fuel supply conduit.

24. The fuel transfer device according to claim 23, wherein the fuel flow regulator comprises an orifice having a fixed bore dimension.

25. The fuel transfer device according to claim 19, wherein a connector block is disposed about the fuel supply conduit and the vapor return conduit so as to secure the conduits in parallel orientation, said connector block comprising a substantially rigid material.

26. The fuel transfer device according to claim 19, wherein the fuel flow control valve comprises:

(a) a lever;

(b) a poppet valve having an elongated valve stem in operative engagement with the lever; and (c) a spring to bias the lever and the poppet valve to a normally closed position.

27. The fuel transfer device according to claim 19, wherein the fuel supply coupling comprises a quick connect dry break coupling having a female member attached to the outlet end of the first portion of the fuel supply conduit, and a male member attached to the inlet end of the second portion of the fuel supply conduit.

28. The fuel transfer device according to claim 19, wherein the vapor return coupling comprises a quick connect dry break coupling having a female member attached to the outlet end of the first portion of the vapor return conduit, and a male member attached to the inlet end of the second portion of the vapor return conduit.

29. The fuel transfer device according to claim 20, wherein the primary fuel line is the fuel rail of a fuel injected internal combustion engine.

30. The fuel transfer device according to claim 20, wherein the means for recovering vapor comprises a vapor recovery hood disposed about the outlet end of the fuel supply conduit, the hood having an opening through which the outlet end of the fuel supply conduit passes, the interior of said hood being in fluid communication with the inlet end of the vapor return conduit.

31. The fuel transfer device according to claim 30, wherein the vapor recovery hood comprises an elastomeric bellows.

32. The fuel transfer device according to claim 30, wherein the fuel supply conduit contains a flow regulator for controlling the volume of fuel flowing through the fuel supply conduit.

33. The fuel transfer device according to claim 32, wherein the fuel flow regulator comprises an orifice having a fixed bore dimension.

34. The fuel transfer device according to claim 32, wherein a connector block is disposed about the fuel supply conduit and the vapor return conduit so as to secure the conduits in parallel orientation, said connector block comprising a substantially rigid material.

35. The fuel transfer device according to claim 34, wherein the fuel flow control valve comprises:

(a) a lever;

(b) a poppet valve having an elongated valve stem in operative engagement with the lever; and (c) a spring to bias the lever and the poppet valve to a normally closed position.

36. The fuel transfer device according to claim 35, wherein the fuel supply coupling comprises a quick connect dry break coupling having a female member attached to the outlet end of the first portion of the fuel supply conduit, and a male member attached to the inlet end of the second portion of the fuel supply conduit.

37. The fuel transfer device according to claim 36, wherein the vapor return coupling comprises a quick connect dry break coupling having a male member attached to the outlet end of the first portion of the vapor return conduit, and a female member attached to the inlet end of the second portion of the vapor conduit.

* * * * *